United States Patent
Reichert et al.

[11] Patent Number: 5,752,588
[45] Date of Patent: May 19, 1998

[54] HYDRAULIC SERVO AUTOMATIC TRANSMISSION FRICTION BRAKE BAND

[75] Inventors: Eric Reichert, Leverkusen; Friedel Lauscher, Kreuzau-Drove, both of Germany

[73] Assignee: Ford Global Technologies, Inc., Dearborn, Mich.

[21] Appl. No.: 655,540

[22] Filed: May 30, 1996

[30] Foreign Application Priority Data

Jun. 3, 1995 [DE] Germany ............ 195 20 447.6

[51] Int. Cl.$^6$ ............................................. F16H 61/28
[52] U.S. Cl. ................................. 188/77 R; 188/366
[58] Field of Search ..................... 188/77 R, 72.4, 188/366, 72.5

[56] References Cited

U.S. PATENT DOCUMENTS

| | | | |
|---|---|---|---|
| 2,513,192 | 6/1950 | McFarland | 188/77 R |
| 2,636,578 | 4/1953 | Swift | 188/77 R |
| 2,901,888 | 9/1959 | Swift | 188/77 R |
| 3,004,390 | 10/1961 | Duffy | 188/77 R |
| 4,388,986 | 6/1983 | Umezawa | 188/77 R |
| 4,428,462 | 1/1984 | Warwick et al. | |
| 4,802,559 | 2/1989 | Fourie et al. | |

FOREIGN PATENT DOCUMENTS

| | | | |
|---|---|---|---|
| 1680596 | 4/1973 | Germany. | |
| 1077764 | 8/1967 | United Kingdom | 188/77 R |

OTHER PUBLICATIONS

SAE, Design Practices, "Passenger Car Automatic Transmissions", vol. 5, Revised 2nd Edition, pp. 113–115.

*Primary Examiner*—Matthew C. Graham
*Attorney, Agent, or Firm*—Frank G. McKenzie

[57] ABSTRACT

A hydraulic servo for friction brakes of an automatic transmission comprises a cylinder (2) with a main piston (3) arranged therein, a smaller cylinder (8) to receive a smaller compensation piston (9), the smaller cylinder communicating with the pressure chamber (5) of the main piston (3) through an orifice (18) controlled by a ball valve (20). A stepped bore (22) connects the pressure chamber (5) to the compensation chamber (17). A stepped piston (23), located in the bore, forms a discharge control valve (24), which controls the discharge of pressure medium from the compensation chamber (17).

5 Claims, 3 Drawing Sheets

HYDRAULIC SERVO AUTOMATIC TRANSMISSION FRICTION BRAKE BAND

BACKGROUND OF THE INVENTION

1. Field of the Invention

The invention relates to the field of hydraulic servos for a friction brake of an automatic transmission for motor vehicles.

2. Description of the Prior Art

An hydraulic servo with travel compensation for friction brakes is known from U.S. Pat. No. 4,428,462, in which, in a main piston in a cylinder, there is a compensating piston located in a smaller cylinder, which is in communication with the pressure chamber of the main piston through an orifice controlled by a spring-loaded ball valve.

This known hydraulic servo with travel compensation for friction brakes is intended for a shoe brake of a railroad vehicle, and the compensation piston in the main piston is provided to keep the air gap in the brake constant.

German Patent 16 80 596 discloses an hydraulic servo, particularly for the friction brakes of a change-speed gearbox, in which a compensation piston is likewise fitted in a main piston and is in communication with the pressure chamber of the main piston through a controlled orifice. However, this compensation piston is intended to act as a pressure reservoir, which delays the application of the main piston.

SUMMARY OF THE INVENTION

It is an object of the invention to provide an hydraulic servo with travel compensation, for friction brakes for shifting an automatic transmission for motor vehicles, in order, at the time of a shift, to minimize the volume of hydraulic fluid required to apply a friction brake to avoid an undesired pressure drop due to the volume of fluid which has to be made available.

To this end, according to the invention, in an hydraulic servo of the kind referred to, a stepped bore connecting the pressure chamber to the compensation chamber is provided in the main piston, which forms a discharge control valve for a discharge duct controlling the discharge of pressure medium from the compensation chamber. The ball valve in the main piston opens when pressure is applied from the pressure chamber to the compensation chamber and closes when pressure is applied in the opposite direction. When an increase in pressure in the pressure chamber is initiated, the discharge duct is first closed by means of the stepped piston, ensured by the spring of the ball valve, and, as a result, the compensation piston is displaced in its cylinder by the pressure medium flowing in through the ball valve. The ball valve is closed as a result of the higher pressure in the compensation chamber due to the area ratio (the ratio of the area of pressure chamber to the area of compensation chamber), so that on further increase in pressure the main piston applies the brake band with torque capacity. Following relief of the pressure in the pressure chamber, the stepped piston opens the discharge duct, and the main piston and the compensation piston are returned to their starting positions. The return of the main piston and the compensation pistons to their respective starting positions may be effected by respective return springs or sets of springs.

By means of the invention, the travel compensation at the start of a shift can be brought about with a small volume of hydraulic fluid, so that on the subsequent actuation of the friction brake by the main piston there is no longer any undesired fall in pressure.

BRIEF DESCRIPTION OF THE DRAWINGS

The invention will now be described in more detail, by way of example, with reference to an embodiment shown in the accompanying drawings, in which.

DESCRIPTION OF A PREFERRED EMBODIMENT

Figure 1:
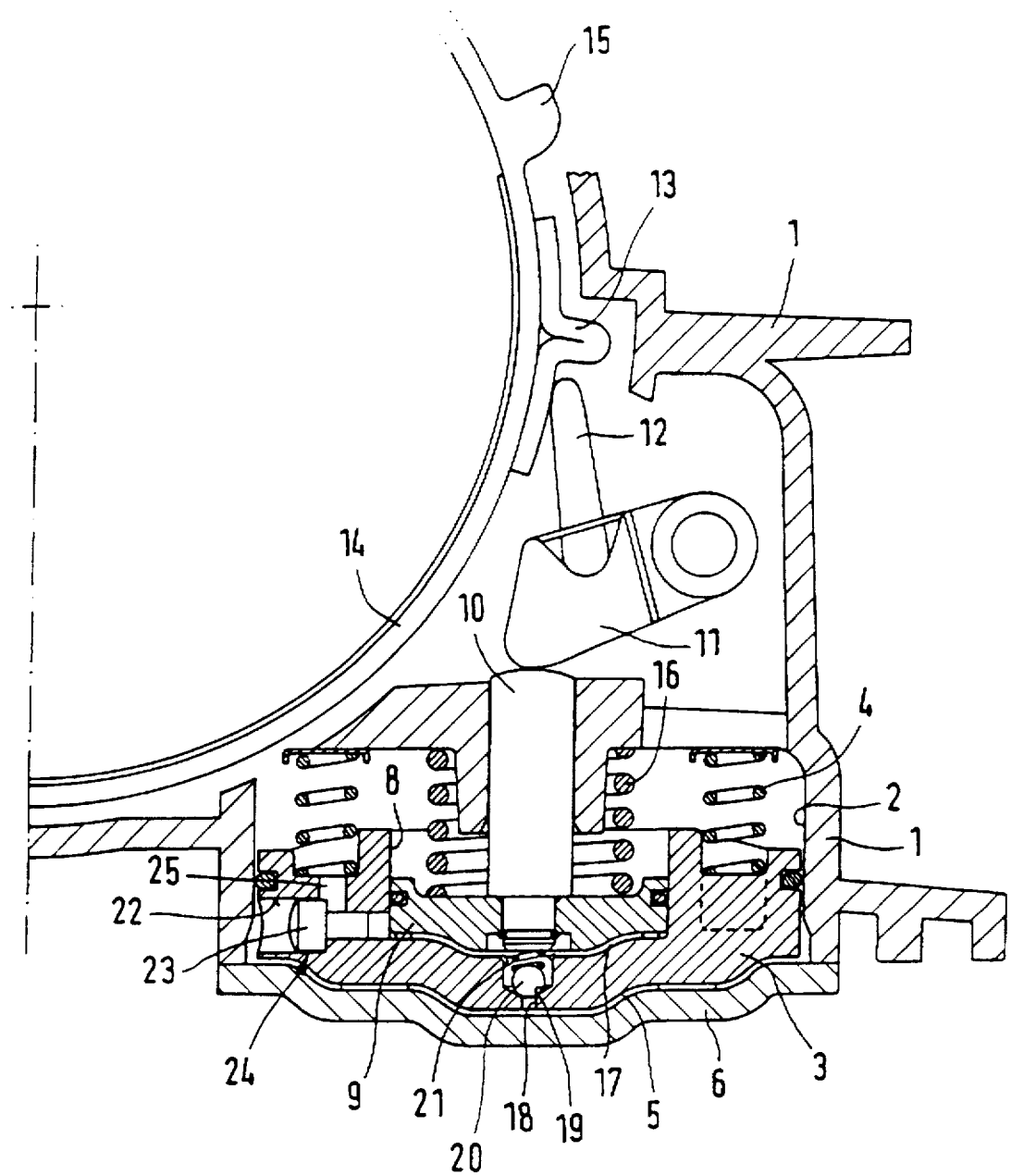
FIG. 1 shows a vertical section through part of an automatic transmission in the region of a brake band which can be applied by means of an hydraulic servo.
Figure 2:
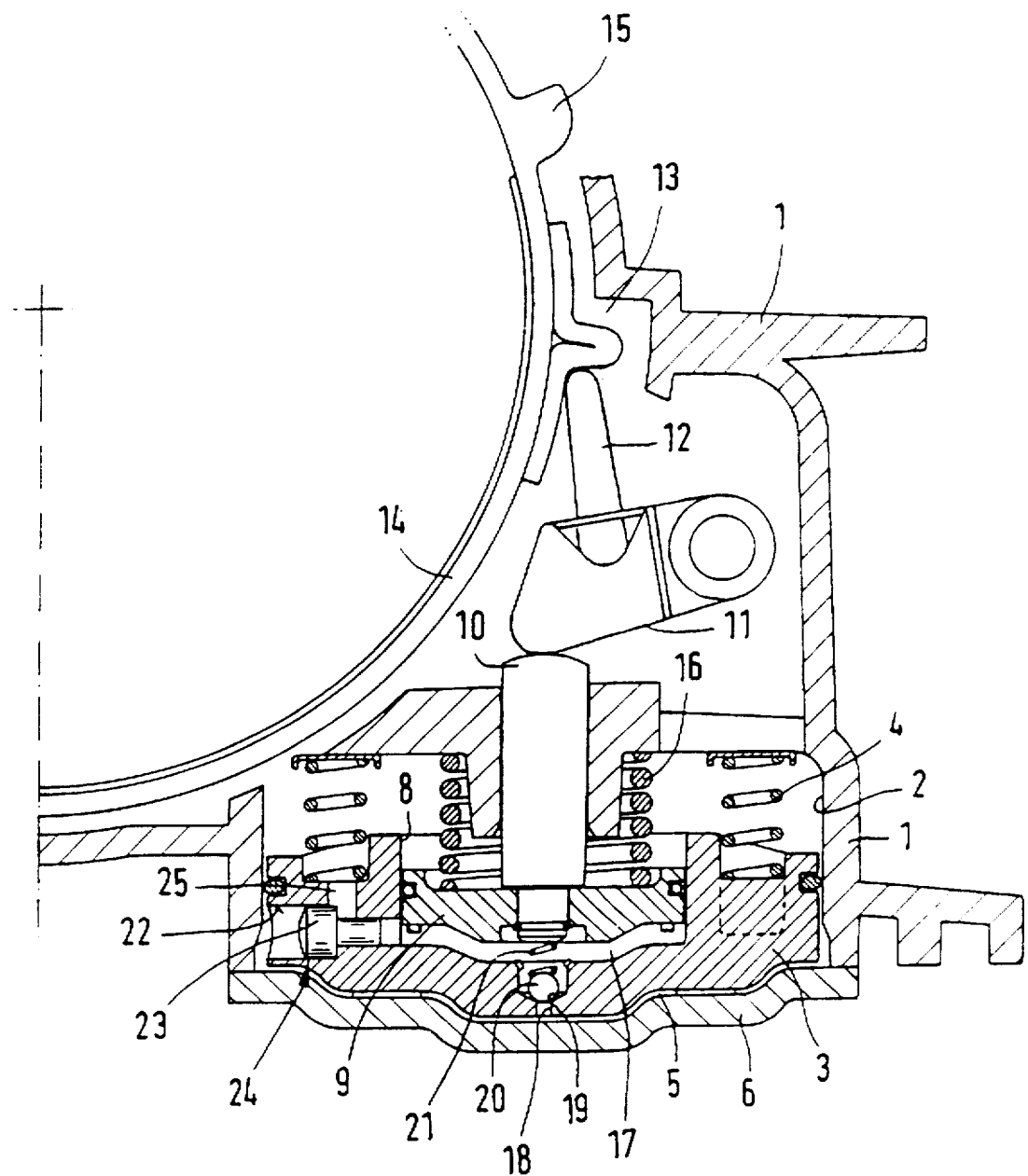
FIG. 2 shows the section of FIG. 1 with a compensation piston forced outward in its cylinder.

In FIG. 1, part of an automatic transmission of a motor vehicle is shown in section, and comprises a transmission housing 1, in the lower lateral region of which the cylinder 2 for a main piston 3 of the hydraulic servo is formed. The main piston 3, slidably fitted in the cylinder 2, is urged by a return spring set 4 in the direction of release of the hydraulic servo. The pressure chamber 5 of the hydraulic servo is bounded by a cover 6, which closes the cylinder 2.

The pressure chamber 5 of the hydraulic servo can be pressurized through a pressure medium channel (not shown) which is disposed in the housing 1.

A smaller cylinder 8 for a compensation piston 9 is disposed in a part of the main piston 3, the compensation piston 9 preferably being connected to a piston rod 10, which acts by way of an actuating lever 11 and a bracing member 12 on one end 13 of a brake band 14, the other end 15 of which is supported in known manner (not shown) in the housing 1. The compensation piston 9 is urged in the direction of release by means of a return spring 16.

The cylinder 8 and compensation piston 9 together form a compensation chamber 17, which is in communication with the pressure chamber 5 of the main piston 3 via a bore 18, in which a valve seat 19 for a ball valve 20 is located.

The compensation piston 9 can, like the main piston 3, be sealed by means of a seal fitted in a groove, or it can merely be sealed by a suitable fit.

In a radial stepped bore 22 in the main piston 3, which connects the pressure chamber 5 of the main piston 3 with the compensation chamber 17, is arranged a stepped piston 23 which, together with the stepped bore 22, forms a discharge control valve for a discharge duct 25, by means of which discharge of pressure medium from the compensation chamber 17 can be controlled.

The compensation piston 9 carries on its lower end a spring 21 which loads the ball 20 in the discharge state and ensures that the discharge control valve 24 first closes before the ball valve 20 opens. The spring 21 is locked in a recess in the end of the piston rod 10 and the ball 20 is secured in its bore 18 by caulking to prevent it from falling out.

If operation of the hydraulic servo is desired, pressure medium is fed under pressure through the connecting duct into the pressure chamber 5 beneath the main piston 3 and the pressure medium acting on the discharge control valve 24 displaces its stepped piston 23 radially inwards into a position in which the discharge duct 25 is blocked.

The coil pressure spring 21 acts with slight spring force against the ball valve 20, thereby always ensuring that, on pressurizing the pressure chamber 5, the discharge control valve 24 is closed first, before ball valve 20 opens. At a low pressure level, the pressure medium can get into the compensation chamber 17 through orifice 18 and ball valve 20 to move the compensating piston 9 upward in cylinder 8, counter to force of return spring 16, until the brake band 14 bears on the whole circumference of the brake drum (not shown).

Figure 3:
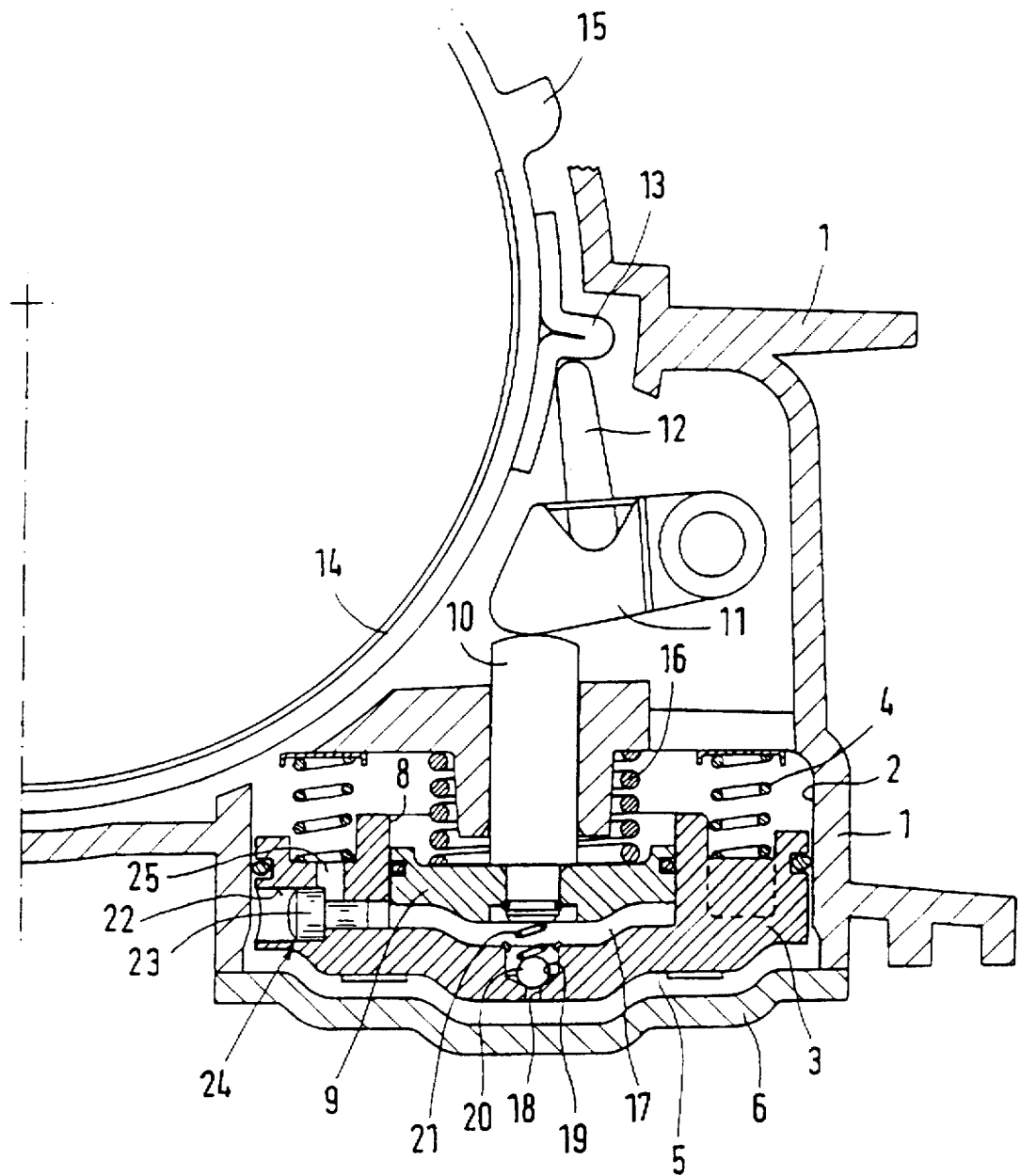
FIG. 3 shows the section of FIG. 1 with a main piston forced outward in its cylinder.

When the piston rod 10 is fully moved upward and there is a further increase in pressure, a pressure proportional to the area ratio (area of compensation piston 9 to area of main piston 3) is set up in the compensation chamber 17. This higher pressure forces the ball 20 onto its seat 19 and consequently closes the volume in the compensation chamber 17. From this point in time, a further increase in pressure acts only on the piston face of the main piston 3, which actuates, by way of the piston rod 10, the brake band 14 in such a way that a torque transfer capacity is now made available (see FIG. 3).

To release the brake band 14, the pressure chamber beneath the main piston 3 is vented. As a result, the pressure acting on the larger face of the stepped piston 23 also falls and pressure in the compensation chamber 17, which acts on the smaller face of the stepped piston 23, exceeds the falling pressure in the pressure chamber 5, displaces the stepped piston 23 to the left, and opens the discharge passage 25. As a result, the compensation chamber 17 is also vented, and the expansion effect of the brake band 14 and force of the spring 16 push the piston rod 10 and compensation piston 9 back to the starting position.

Disregarding frictional forces, this results in the following calculation equations:
Conditions for lash compensation $$P_{servo} * A_{servo} - Spring_{servo} < P_{servo} * A_{compensation\ chamber} - Spring_{return}$$

Conditions for venting $$P_{compensation\ chamber} * A_{2valve} > P_{servo} * A_{1valve}$$

$$\text{with: } P_{compensation\ chamber} = \frac{Spring_{return}}{A_{compensation\ chamber}}$$

General pressure equation $$P_{compensation\ chamber} = \frac{P_{servo} * A_{servo} - Spring_{servo}}{A_{compensation\ chamber}}$$

Should the volume in the compensation chamber 17 escape as a result of leakage, the main piston 3 moves slowly back until it comes into contact with the compensation piston 9 and piston rod 10. However, this would only take place slowly and with a long time delay, so that in no case can an undesired pressure drop occur during application of the brake band.

Consequently, pressurization of the hydraulic servo remains functional at all times even in the event of leakages in the system.

What is claimed is:

1. A servo actuated by pressurized hydraulic fluid for operating a friction brake, comprising:

a pressure chamber;

a main piston, having a relatively large pressure area, moveable in said pressure chamber in response to pressure therein;

a compensation chamber, having a smaller pressure area than that of the main piston;

a compensation piston moveable in the compensation chamber in response to pressure therein;

an orifice connecting the compensation chamber and pressure chamber, opened and closed in response to differential pressure across said orifice;

a first valve continually urged by a spring against the effect of pressure in the pressure chamber to a position where the orifice is closed;

a discharge duct;

a discharge control valve exposed to pressure in the pressure chamber and compensation chamber, for closing communication between the compensation chamber and pressure chamber, and for opening and closing communication between the compensation chamber and discharge duct in response to differential pressure between the pressure chamber and compensation chamber.

2. The hydraulic servo according to claim 1, further comprising:

first return spring means for urging the main piston to return to an end of the pressure chamber; and second return spring means for urging the compensation piston toward an end of the compensation chamber.

3. The hydraulic servo according to claim 1, further comprising:

a friction brake belt; and a piston rod connected to the compensation piston and adapted to apply and release the friction brake belt in response to movement of the friction brake belt.

4. The hydraulic servo according to claim 2 comprising:

a friction brake belt; and a piston rod connected to the compensation piston (9) and adapted to apply and release the friction brake belt in response to movement of the friction brake belt.

5. The hydraulic servo according to claim 1, further comprising:

a first duct hydraulically connecting the discharge duct and compensation chamber;

the discharge control value including a stepped piston, the piston having a head exposed to pressure in the pressure chamber; and a stem connected to the head, located in the first duct, exposed to pressure in the compensation chamber, movable in response to differential pressure across the stepped piston to open and close communication between the compensation chamber and discharge duct, and to close communication between the compensation chamber and pressure chamber.

* * * * *